G. A. Watkins,
Chair Machine,
No. 107,135. Patented Sep. 6, 1870.
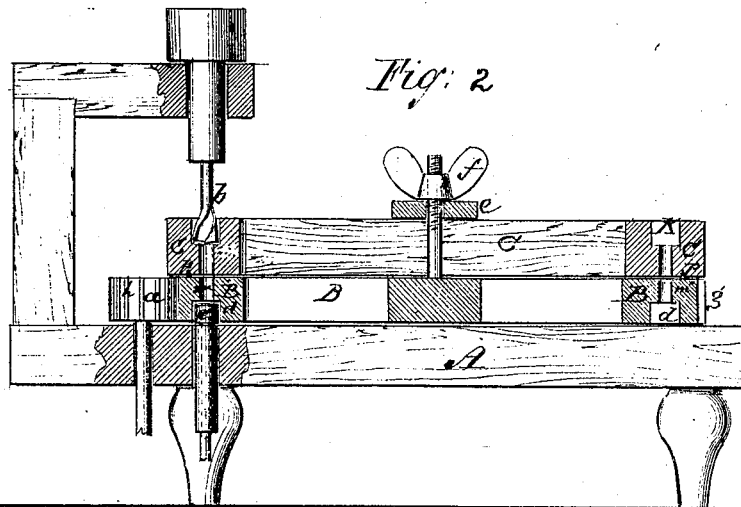
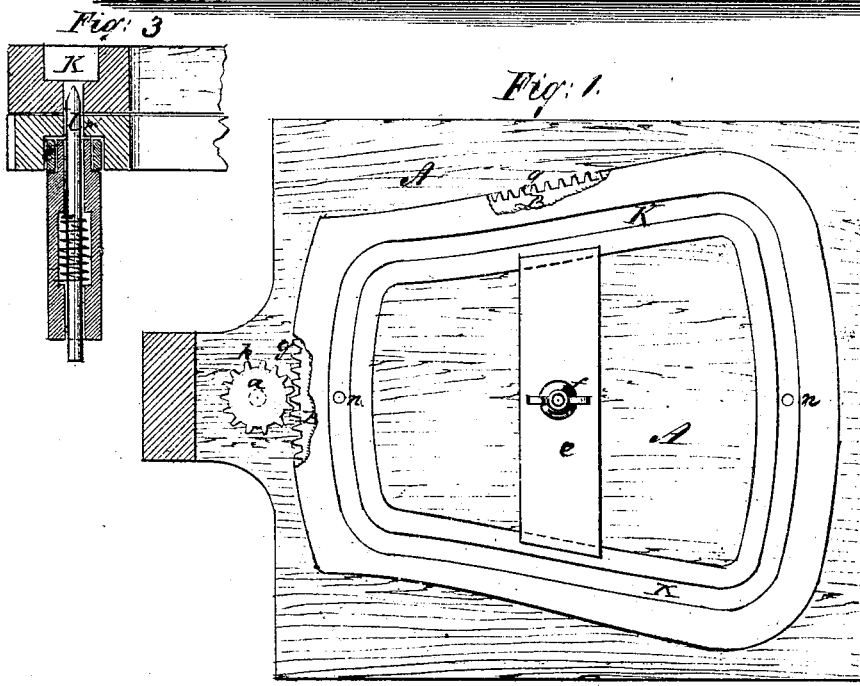
Witnesses
Inventor

United States Patent Office.

GARDNER A. WATKINS, OF CAVENDISH, VERMONT, ASSIGNOR TO THE AMERICAN CHAIR-SEAT COMPANY, OF GARDNER, MASSACHUSETTS.

Letters Patent No. 107,135, dated September 6, 1870.

IMPROVEMENT IN MACHINE FOR GROOVING THE FRAMES OF CHAIR-SEATS.

The Schedule referred to in these Letters Patent and making part of the same

To all whom it may concern:

Be it known that I, GARDNER A. WATKINS, of Cavendish, Proctorsville Post-Office, in the county of Windsor and State of Vermont, have invented a new and useful Machine for Cutting Channels or Grooves in the Frames of Chair-Seats, &c.; and I do hereby declare that the following is a full and exact description thereof, reference being had to the accompanying drawing and to the letters of reference marked thereon making a part of this specification.

This invention relates to a machine for cutting channels or grooves in the frames of chair-seats, &c., for the purpose of receiving a spline and chair-seat fabric, and thus attach the seat-fabric to the seat-frame.

In the accompanying drawing—

Figure 1 represents a plan or top view of my invention;

Figure 2, a side view of the same in section; and

Figure 3, a section of boring-bit and guide-stud.

Similar letters of reference indicate corresponding parts in the drawing.

A represents the bed-plate, and

B, the pattern.

C, the frame of a chair-seat.

a, a gear-wheel.

b, the cutting-tool.

c, a guide-stud.

The pattern B is made of cast-iron, or any other suitable material, and is of the exact shape or form of the seat-frame it is desired to channel.

Around the entire outer edge of said pattern are formed cogs or spurs, g, and into the under side thereof is formed a channel, d, and exactly opposite to each other are drilled the two set-holes m m'.

Onto the upper side of the pattern B is firmly attached (by means of the clamp e and thumb-screw f) the chair-seat frame C, into which it is desired to form a groove or channel.

The pattern B, with the chair-seat frame C secured thereto, as before stated, is placed onto the bed-plate A, in such manner as will allow the guide-stud c to enter into the channel, d, of the pattern B, and, at the same time, allow the cogs or spurs, h, of the gear-wheel a to mesh into the cogs or spurs, g, formed around the outer edge of the pattern B.

Power being then applied, in any desirable manner, to the gear-wheel a, the pattern B, carrying with it the chair-seat frame C, will be moved in an eccentric manner, corresponding to the outline or form of said pattern, the movement or direction of said pattern being limited or governed, however, by the entrance of the guide-stud c into the channel d, so that said pattern is compelled to travel around said guide-stud as a center.

Now, when the cutting-tool b (which is placed directly above and in line with the guide-stud c) is caused to revolve, and is brought down to the chair-seat frame C, while said chair-seat is moving in the manner before described, a groove or channel, k, is cut into said chair-seat frame, corresponding exactly with the channel, d, of the pattern B; and in this way chair-seats, or other similar frames, may be channeled in an accurate, cheap, and expeditious manner.

The guide-stud c is made in the form of a hollow cylinder, through which passes the steel bit l, said bit being revolved, and passing through the set-hole, m, in the pattern B, and drilling the set-holes n n' into the chair-seat frame C, by means of which the channel, k, in said frame is started in a direction exactly corresponding with the channel, d, of the pattern B; or, instead of using the bit l for this purpose, the cutting-tool b may be brought down, and the set-holes n n' be thus drilled.

Instead of the set-holes n n', a sharpened pin, p, may be attached to the pattern B, which will enter into the under side of the chair-seat frame C, and in this way the frame and pattern may be placed exactly the one over the other, and kept in said position, when the same result will be obtained as by the use of the set-holes n n'.

It is designed, in practice, to fit the guide-stud c in the bed-plate A, in such manner, by springs or otherwise, as that, when the pattern B has revolved from one set-hole to another, said guide-stud c will enter into said set-hole m, and the bit l will enter into the set-hole n, and check the movement of the pattern B when the channel k has been cut.

Instead of forming the outer edges of the pattern B with cogs or spurs, said pattern may be made without said cogs or spurs, in which case it may be fed by hand, depending solely upon the action of the guide-stud c in the channel d for accuracy; or said pattern may be fed by friction applied in any desirable manner. Or, if desired, said cogs or spurs may be formed around the inner edge of the pattern B, and thus be fed by a gear-wheel or other equivalent means.

Having thus described my invention,

What I claim as new, and desire to secure by Letters Patent, is—

The herein-described machine for cutting grooves in chair-seat frames, composed of the rotary cutter b, clamp e f, pattern B, with holes m m' and rack g, and made in the form of a chair-seat, the pinion a, and hollow guide-stud c containing a bit, l, all arranged upon the plate A, and constructed and operating in the manner set forth.

G. A. WATKINS.

Witnesses:
H. L. WATTENBERG,
G. M. PLYMPTON.